United States Patent
Liang et al.

(10) Patent No.: US 9,910,462 B2
(45) Date of Patent: Mar. 6, 2018

(54) DISPLAY MODULE AND ELECTRONIC DEVICE INCLUDING THE SAME

(71) Applicant: Wistron Corporation, New Taipei (TW)

(72) Inventors: Chen-Yi Liang, New Taipei (TW);
Chun-Chien Chen, New Taipei (TW);
Yu-Hao Luo, New Taipei (TW);
Chien-Hung Yeh, New Taipei (TW)

(73) Assignee: Wistron Corporation, New Taipei (TW)

( * ) Notice: Subject to any disclaimer, the term of this patent is extended or adjusted under 35 U.S.C. 154(b) by 732 days.

(21) Appl. No.: 14/525,391

(22) Filed: Oct. 28, 2014

(65) Prior Publication Data
US 2015/0301393 A1   Oct. 22, 2015

(30) Foreign Application Priority Data

Apr. 17, 2014   (TW) .............................. 103114042 A

(51) Int. Cl.
*G02F 1/1335*   (2006.01)
*G06F 1/16*   (2006.01)
*G02F 1/1333*   (2006.01)

(52) U.S. Cl.
CPC ...... *G06F 1/1675* (2013.01); *G02F 1/133608* (2013.01); *G06F 1/162* (2013.01); *G06F 1/1616* (2013.01); *G06F 1/1637* (2013.01); *G02F 2001/133342* (2013.01)

(58) Field of Classification Search
CPC ........... G02F 1/13338; G02F 1/133608; G02F 2001/133342; G06F 3/0412; G06F 1/1675; G06F 1/1616; G06F 1/162; G06F 1/1637
USPC .......................................................... 349/12
See application file for complete search history.

(56) References Cited

U.S. PATENT DOCUMENTS

| | | | |
|---|---|---|---|
| 2005/0046765 A1* | 3/2005 | Liu ................... | G02F 1/133615 349/61 |
| 2006/0209567 A1* | 9/2006 | Sakurai .................. | G02B 6/005 362/626 |
| 2009/0059102 A1* | 3/2009 | Chien ................... | G02F 1/1336 349/5 |
| 2009/0086114 A1* | 4/2009 | Higuchi .............. | G02F 1/13338 349/12 |
| 2015/0205037 A1* | 7/2015 | Hsiao .................... | G02F 1/1333 362/613 |

FOREIGN PATENT DOCUMENTS

JP   2004325966   * 11/2004

* cited by examiner

*Primary Examiner* — Nathanael R Briggs
*Assistant Examiner* — William Peterson
(74) *Attorney, Agent, or Firm* — Winston Hsu

(57) ABSTRACT

A display module includes a liquid crystal unit and a backlight unit. The backlight unit has a light exit surface, and a movable portion that is movable between a location at which the light exit surface faces toward a front display surface of the liquid crystal unit, and another location at which the light exit surface faces toward a rear display surface of the liquid crystal unit, such that the display module is able to display images on the rear display surface or the front display surface.

19 Claims, 21 Drawing Sheets

DISPLAY MODULE AND ELECTRONIC DEVICE INCLUDING THE SAME

CROSS-REFERENCE TO RELATED APPLICATION

This application claims priority to Taiwanese Application No. 103114042, filed on Apr. 17, 2014, the entire disclosure of which is incorporated herein by reference.

BACKGROUND OF THE INVENTION

1. Field of the Invention

The invention relates to a display module and an electronic device, and more particularly to a display module configured to switchably display images toward one of a front side and a rear side, and an electronic device including the display module.

2. Description of the Related Art

Liquid crystal displays (LCD), which are commonly used as a display device in a variety of electronic devices, are configured to display images to users by cooperation of a backlight module and a liquid crystal module. An LCD is usually structured with one backlight module and one liquid crystal module, which are limited to a fixed relative position therebetween by a screen frame, so that the liquid crystal module may only display images toward one side, and is unable to switchably display images toward a selected one of two opposing sides, thus limiting applications thereof. To solve this problem, a rotatable display design has been proposed that allows vertical or horizontal rotation of the LCD by 180 degrees through use of a specific screen rotation mechanism, so that a display surface thereof can be rotated to face an opposite side for another operation mode. However, the mechanism that enables rotation of the screen usually has a complex structure and a large size, which may lead to inconvenience in manufacturing, and which may raise an overall size and material cost of electronic devices.

SUMMARY OF THE INVENTION

Therefore, an object of the present invention is to provide a display module that may switchably display images toward either one of a front side and a rear side of the display module while having a relatively small size and incurring a relatively low manufacturing cost.

According to one aspect of the present invention, a display module comprises:

a screen frame including a frame body that has a front frame surface facing toward a front side, and that has a rear frame surface opposite to the front frame surface and facing toward a rear side;

a liquid crystal unit that has a front display surface and a rear display surface, that is configured to display an image on one of the front display surface and the rear display surface, and that is mounted to the screen frame, the front display surface being exposed from the screen frame and facing toward the front side, the rear display surface being exposed from the screen frame and facing toward the rear side; and a backlight unit having a light exit surface, and configured to emit light from the light exit surface, the backlight unit having a movable portion that is movably disposed on the screen frame and that is movable between a front frame surface location at which the light exit surface faces toward the front display surface of the liquid crystal unit, and a rear frame surface location at which the light exit surface faces toward the rear display surface.

Another object of the present invention is to provide an electronic device that includes the display module of this invention.

According to another aspect of the present invention, an electronic device comprises:

a display module of this invention; and an operation module electrically coupled to the display module for providing electrical power thereto, and configured to control the display module to display the image on the rear display surface when the movable portion of the backlight unit is at the front frame surface location, and to display the image on the front display surface when the movable portion of the backlight unit is at the rear frame surface location.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE EMBODIMENTS

Figure 1:
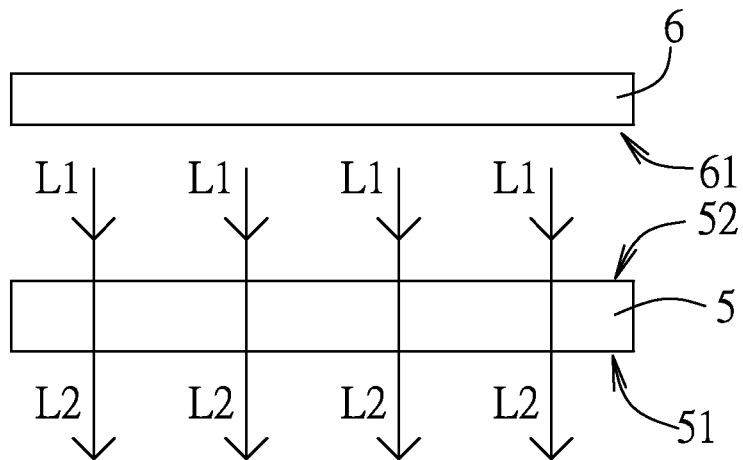
FIG. 1 is a schematic diagram illustrating a first display state of a display module of a first embodiment of an electronic device according to the present invention.

Referring to FIGS. 1, 2, 7 and 8, the first embodiment of the electronic device 100 according to this invention is adapted to switchably operate as a notebook computer or a tablet computer, but should not be limited thereto.

The electronic device 100 includes a display module 1, an operation module 2 and a connecting mechanism 3. The display module 1 includes a screen frame 4, a liquid crystal unit 5, a backlight unit 6, a magnetic unit 7 and a sensing unit 8.

The screen frame 4 of the display module 1 includes a frame body 41 that has a front frame surface 411 facing toward a front side, and that has a rear frame surface 412 opposite to the front frame surface 411 and facing toward a rear side. The liquid crystal unit 5 of the display module 1 has a front display surface 51 and a rear display surface 52, is configured to display an image, which is exemplified using an image of a house in the drawings, on the front display surface 51 or the rear display surface 51, and is mounted to the screen frame 4. The front display surface 51 is exposed from the screen frame 4 and faces toward the front side. The rear display surface 52 is exposed from the screen frame 4 and faces toward the rear side. The backlight unit 6 has a light exit surface 61, is configured to emit light (i.e., a backlight beam L1) from the light exit surface 61, is movably disposed on the screen frame 4, and is movable between a front frame surface location (see FIG. 2) at which the light exit surface 61 faces toward the front display surface 51 of the liquid crystal unit 5, and a rear frame surface location (see FIG. 1) at which the light exit surface 61 faces toward the rear display surface 52. In this embodiment, the whole backlight unit 6 serves as a movable portion thereof.

Figure 5:
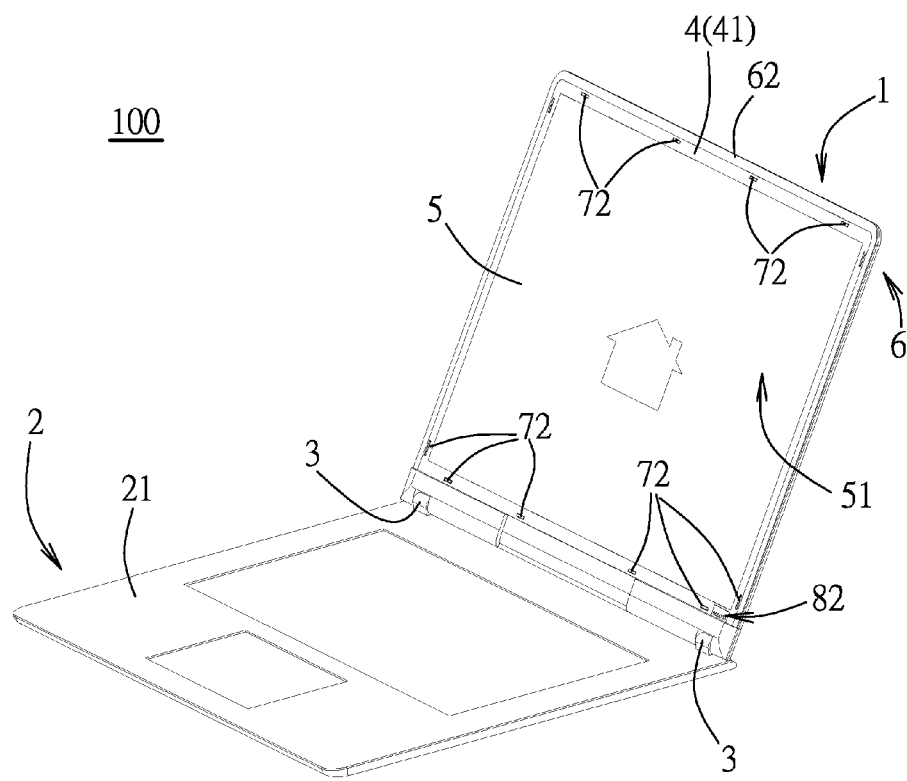
FIG. 5 is a schematic diagram illustrating another configuration of the first embodiment in the first display state.
Figure 6:
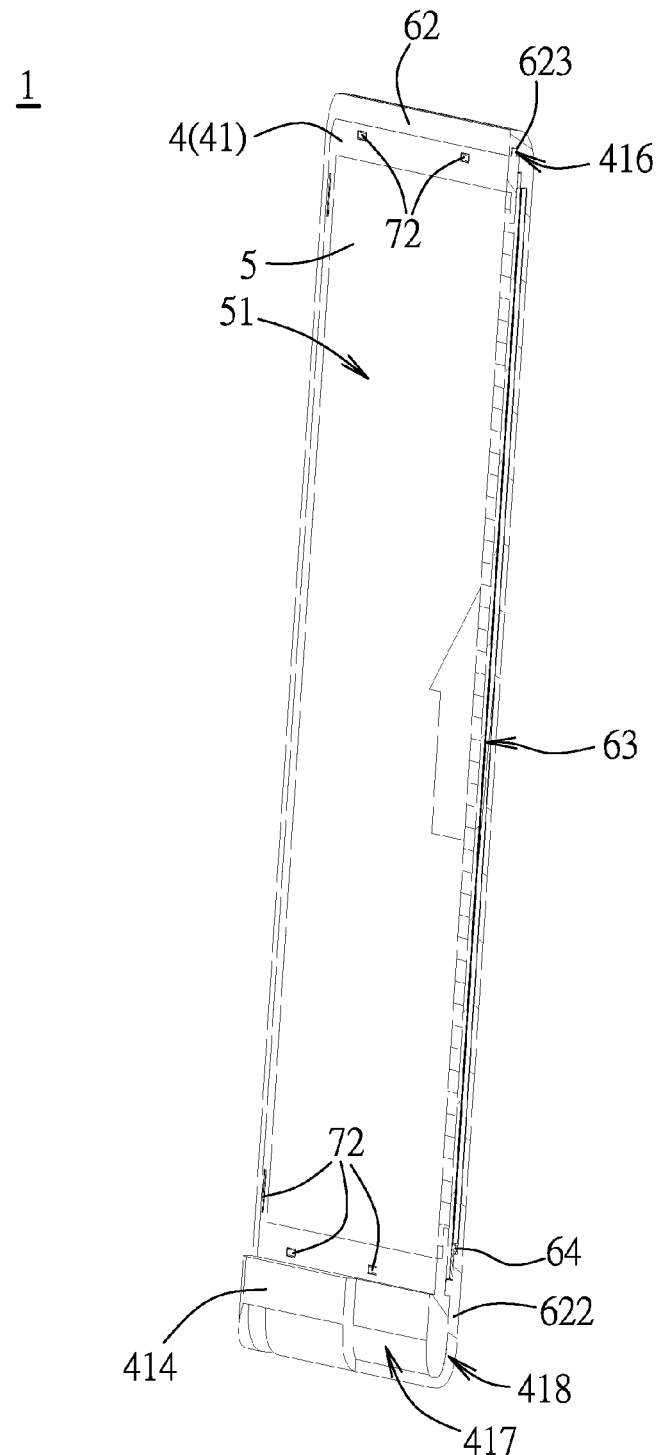
FIG. 6 is a fragmentary perspective view illustrating a section of the first embodiment in the first display state.

Referring to FIGS. 1 and 5, when the electronic device 100 is at a first display state, the light exit surface 61 of the backlight unit 6 faces toward the rear display surface 52 of the liquid crystal unit 5, and the backlight beam L1 is provided to the liquid crystal unit 5 via the rear display surface 52, so that the image can be displayed on the front display surface 51 of the liquid crystal unit 5 for viewing by a user after the liquid crystal unit 5 converts the backlight beam L1 into an image beam L2. Therefore, in the first display state, the user may operate the electronic device 100 as a notebook computer.

Figure 2:
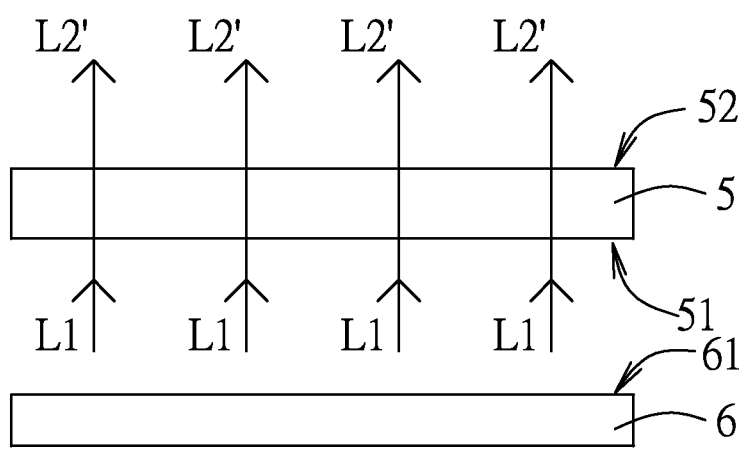
FIG. 2 is a schematic diagram illustrating a second display state of the display module of the first embodiment.
Figure 9:
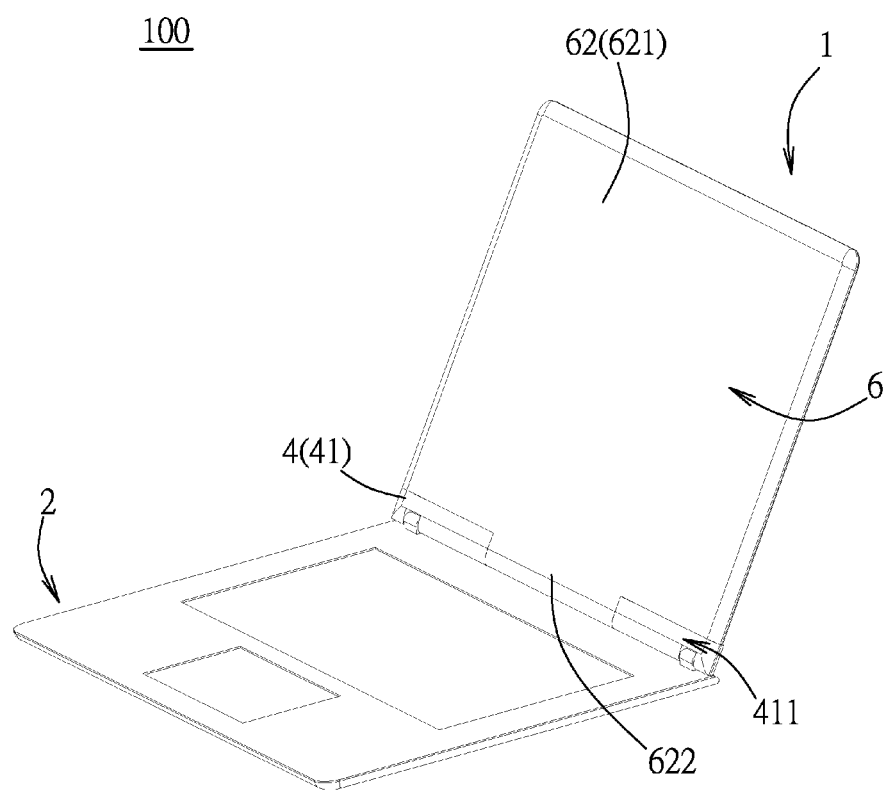
FIG. 9 is a perspective view showing the first embodiment in the second display state.
Figure 10:
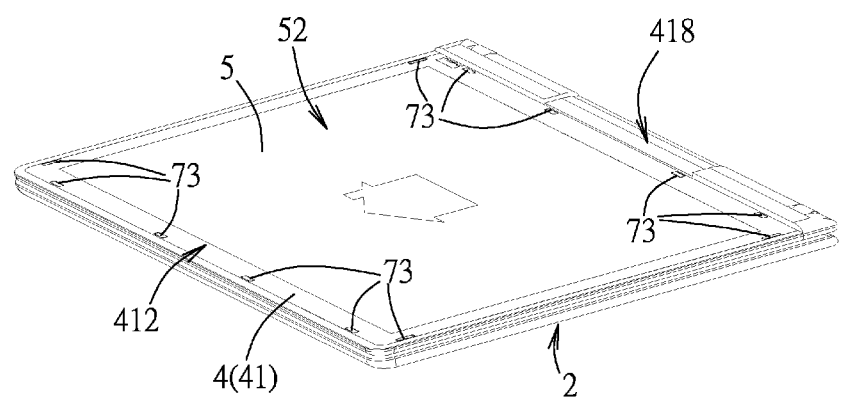
FIG. 10 is a perspective view showing a configuration of the first embodiment in the second display state modified from FIG. 9.

Referring to FIGS. 2, 9 and 10, since the backlight unit 6 of this embodiment is designed to be removable, the user may change a location at which the backlight unit 6 is installed such that the light exit surface 61 of the backlight unit 6 faces the front display surface 51 of the liquid crystal unit 5 (i.e., the rear frame surface location). At this time, the backlight unit 6 provides the backlight beam L1 to the liquid crystal unit 5 via the front display surface 51, the liquid crystal unit 5 converts the backlight beam L1 into an image beam L2', and the image is displayed on the rear display surface 52 of the liquid crystal unit 5. Therefore, by changing the location where the backlight unit 6 is installed, the display module 1 is switched to operate in a second display state in which the image is displayed on the rear display surface 52. In the second display state, the user may fold the electronic device 100 such that the display module 1 is stacked on the operation module 2, and may operate the electronic device 100 as a tablet computer, as shown in FIG. 10.

Referring to FIGS. 6 to 8, 10 and 11, in this embodiment, the frame body 41 of the screen frame 4 is configured for installation of the liquid crystal unit 5 and the backlight unit 6, and has a top frame portion 413, a bottom frame portion 414 spaced apart from the top frame portion 413, and two spaced-apart side frame portions 415 respectively interconnecting the top frame portion 413 and the bottom frame portion 414.

Furthermore, the frame body 41 is formed with a plurality of positioning portions 416, a front groove 417 and a rear groove 418. The positioning portions 416 extend outwardly for positioning the backlight unit 6 that is mounted to the frame body 41. The front groove 417 is formed in the front frame surface 411 of the frame body 41, and is configured to engage the backlight unit 6 when the backlight unit 6 is set at the front frame surface 411 (i.e., the front frame surface location). The rear groove 418 is formed in the rear frame surface 412 of the frame body 41, and is configured to engage the backlight unit 6 when the backlight unit 6 is set at the rear frame surface 412 (i.e., the rear frame surface location). In this embodiment, the positioning portions 416 extend upwardly from a top part of the frame body 41 (i.e., a top side of the top frame portion 413), the front groove 417 is formed in the front frame surface 411 at a bottom part thereof (i.e., a front surface of the bottom frame portion 414), and the rear groove 418 is formed in the rear frame surface 412 at a bottom part thereof (i.e., a rear surface of the bottom frame portion 414). However, numbers and positions of the positioning portions 416, the front grooves 417 and the rear grooves 418 may be adjusted as required, and should not be limited to those disclosed herein.

Figure 7:
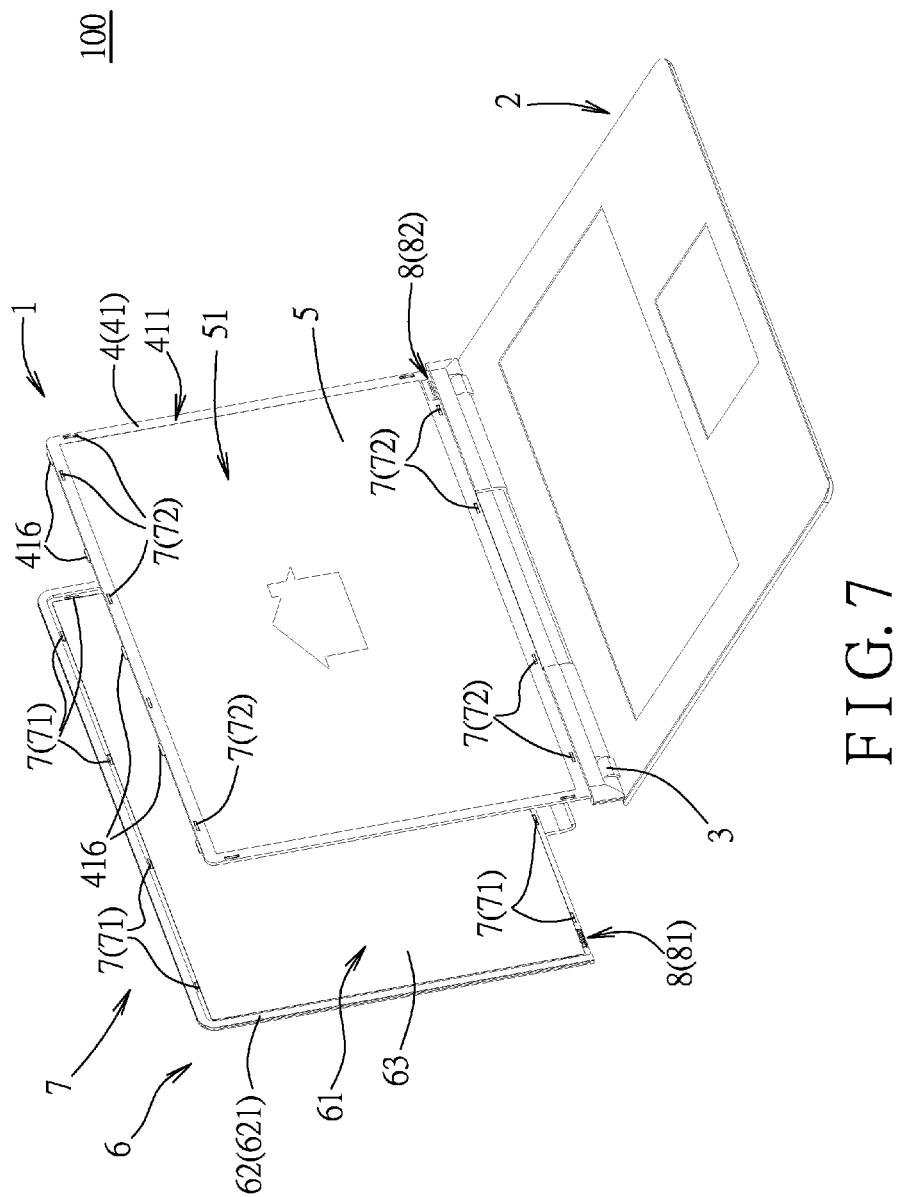
FIG. 7 is a partly exploded view showing a backlight unit of the display module of the first embodiment separated from a liquid crystal unit.
Figure 11:
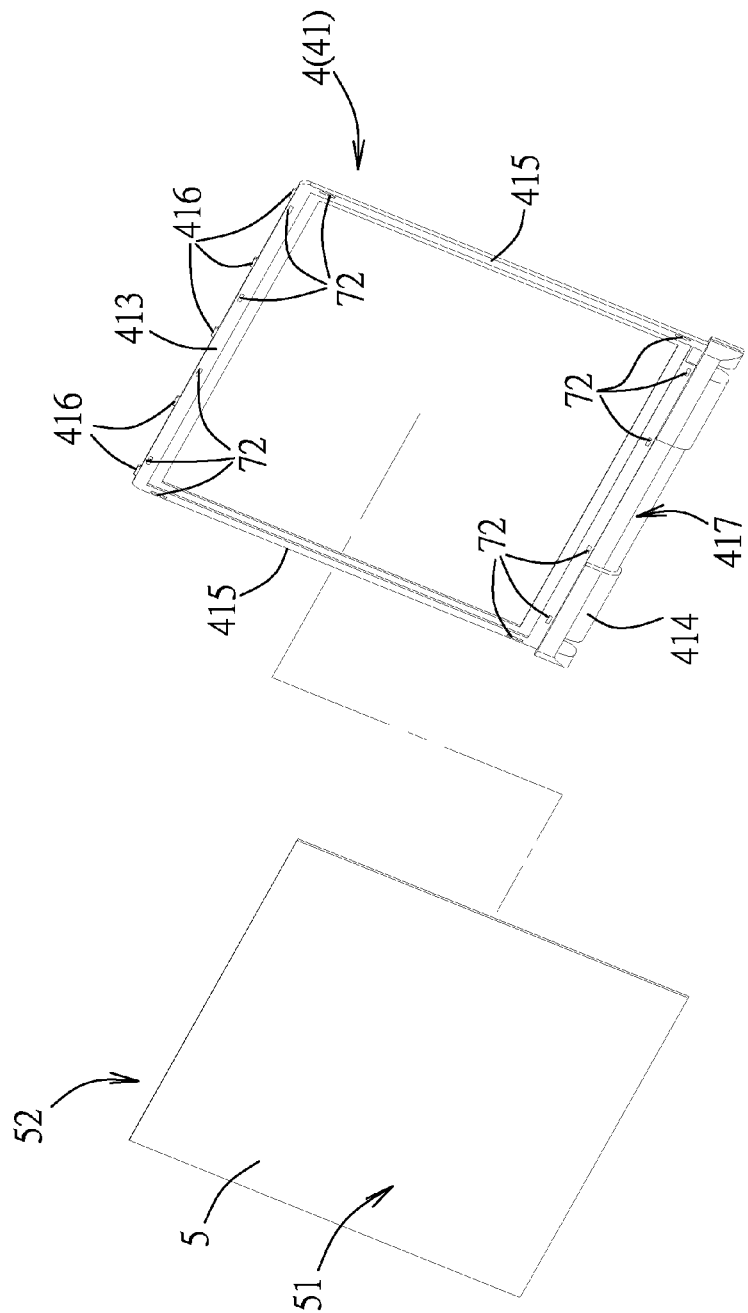
FIG. 11 is a perspective exploded view illustrating an implementation of the display module of the first embodiment.
Figure 12:
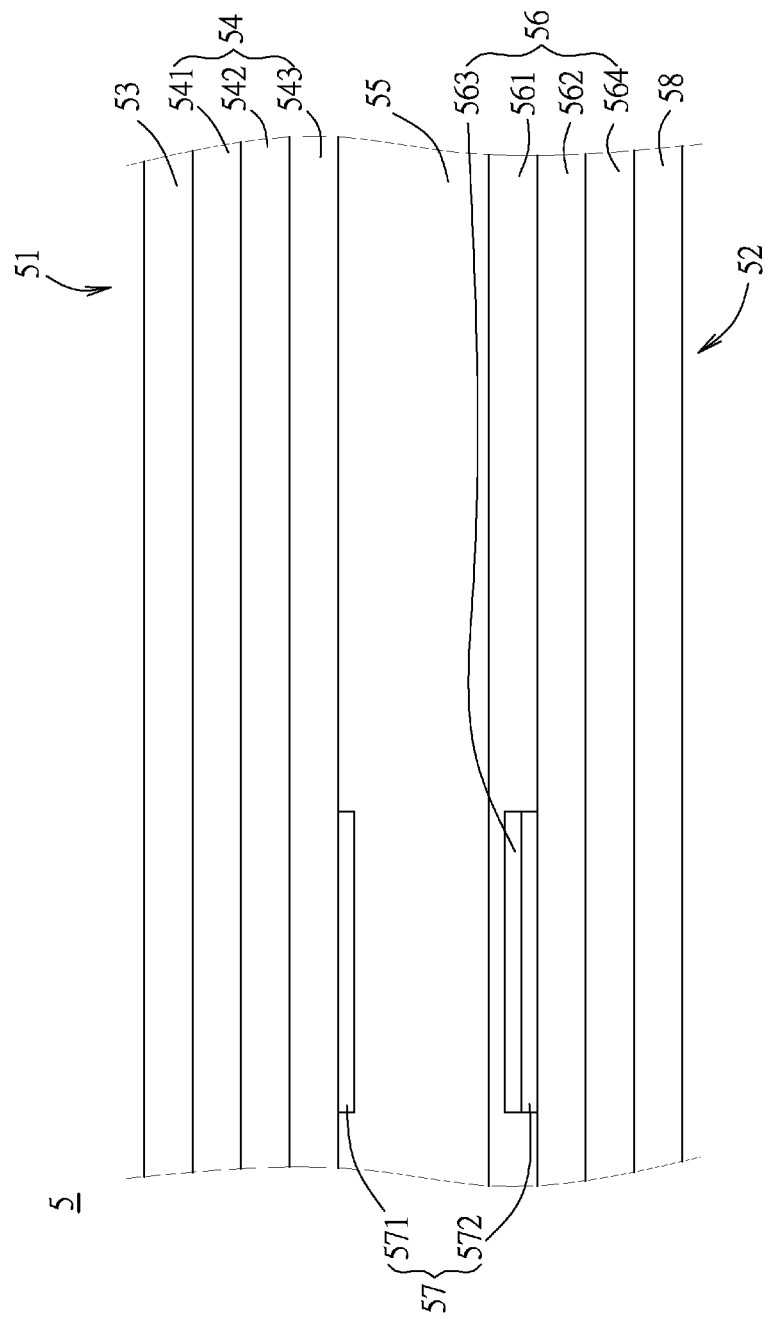
FIG. 12 is a sectional view illustrating an implementation of the liquid crystal unit of the first embodiment.
Figure 13:
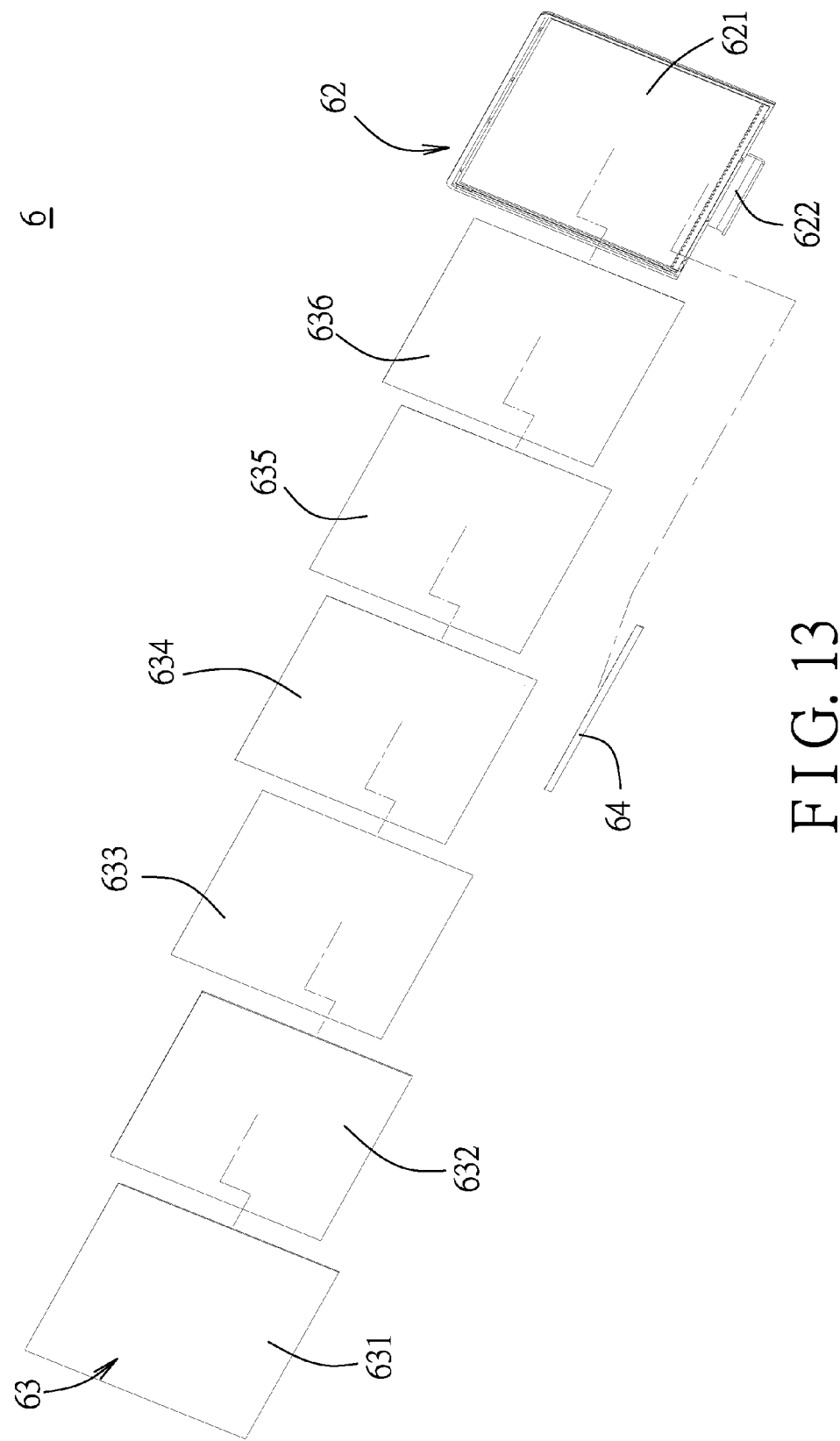
FIG. 13 is an exploded view illustrating an implementation of the backlight unit of the first embodiment.

Referring to FIGS. 7, 11 and 12, the liquid crystal unit 5 is mounted in a space defined by the screen frame 4, provides functions of image display and touch control, and includes a front touch control structure 53, a first optical structure 54, a liquid crystal component 55, a second optical structure 56, a light shielding structure 57 and a rear touch control structure 58. The front touch control structure 53 is disposed at a location corresponding to the front display surface 51 of the display module 1 for generation of a touch control signal in response to touch operation on the front display surface 51 by a user when the display module 1 operates in the first display state as shown in FIG. 5. The first optical structure 54 is configured for installation of the first touch control structure 53, is disposed at a location corresponding to the front display surface 51 of the display module 1, and includes a first polarizer layer 541, a first substrate 542 and a color filter layer 543. The liquid crystal component 55 is disposed between the first optical structure 54 and the second optical structure 56, and is capable of adjusting a transmission characteristic of light passing therethrough. The second optical structure 56 is spaced apart from the first optical structure 54, corresponds to the rear display surface 52, and includes an alignment layer 561, a second substrate 562, a plurality of conductive components 563 disposed on the second substrate 562, and a second polarizer layer 564. The second substrate 562 has a plurality of transparent pixel electrodes (not shown) disposed thereon. The pixel electrodes are provided with electrical signals that serve to set a light transmission characteristic of the liquid crystal component 55 via the conductive components 563 which may be made of a metal. The light shielding structure 57 includes an opaque first shielding layer 571 covered by the color filter layer 543 and disposed in correspondence to the conductive component 563 for preventing light from reflection by the metallic conductive component 563 to the user via the front display surface 51. Since the liquid crystal unit 5 of the present invention may display the image on the rear display surface 52, the light shielding structure 57 further includes an opaque second shielding layer 572 disposed in correspondence to the conductive components 563 on the second substrate 562, such that the conductive components 563 are disposed between the first shielding layer 571 and the second shielding layer 572. In this embodiment, the second shielding layer 572 is stacked with the conductive components 563, and is disposed between the conductive components 563 and the second substrate 562. In other embodiments, placement of the second shielding layer 572 may be adjusted as required, as long as the reflection of light by the conductive components 563 can be prevented. As a result, when the user watches images using the rear display surface 52, image quality may be promoted since the second shielding layer 572 prevents light reflection by the conductive components 563. The rear touch control structure 58 is disposed at a location corresponding to the rear display surface 52 of the display module 1 for generation of a touch control signal in response to touch operation on the rear display surface 52 by the user when the display module 1 operates in the second display state as shown in FIGS. 9 and 10.

According to the abovementioned implementation, the liquid crystal unit 5 of this embodiment is configured so as to be capable of displaying images and providing touch control function on both of the front display surface 51 and the rear display surface 52. The structure of the liquid crystal unit 5 may be adjusted as required. As an example, if the touch control function is not required for the display module 1, the front touch control structure 53 and the rear touch control structure 58 may be omitted, or the display module 1 may be configured to include only one of the touch control structures 53, 58. Moreover, if the conductive components 563 are made of an anti-reflection conductive material, the first and second shielding layers 571 and 572 may be omitted in the liquid crystal unit 5. Accordingly, the configurations of liquid crystal unit 5 disclosed herein are only for illustrating this embodiment, and the present invention should not be limited in this respect.

Referring to FIGS. 6 to 8 and 13, as mentioned hereinbefore, the backlight unit 6 of the display module 1 of this embodiment is designed to be removable. The backlight unit 6 includes a back cover structure 62, a light guiding structure 63 and a light emitting structure 64.

The back cover structure 62 of the backlight unit 6 includes a cover body 621 and a fixing structure 622. The cover body 621 is shaped as a rectangular plate, and is formed with a plurality of grooves 623 at a top part of the cover body 621. The grooves 623 open downward and are configured such that the positioning portions 416, which are disposed at the top part of the frame body 41, removably extend into the grooves 623 when the backlight unit 6 is installed on the screen frame 4 for positioning and engaging the backlight unit 6. The fixing structure 622 is disposed at a bottom part of the cover body 621, extends from an edge of the cover body 621, and has a hook end that bends toward the liquid crystal unit 5, such that the fixing structure 622 removably engages the front groove 417 or the rear groove 418, which are disposed at the bottom part of the frame body 4, when the backlight unit 6 is installed on the screen frame 4.

The light guiding structure 63 of the backlight unit 6 is mounted to the back cover structure 62 for guiding light transmission, and is formed with the light exit surface 61 opposite to the back cover structure 62. In this embodiment, the light guiding structure 63 includes a transparent plate 631, a first diffuser sheet 632, a prism sheet 633, a second diffuser sheet 634, a light guide plate 635 and a reflector sheet 636, so as to achieve effects of light transmission and uniform light emission by cooperation among these components.

The light emitting structure 64 of the backlight unit 6 is mounted to the back cover structure 62, and is configured to emit light to the light guide plate 635 of the light guiding structure 63 to thereby serve as a light source of the backlight unit 6. The light emitting structure 64 may be implemented using a cold cathode fluorescent lamp or an LED (light emitting diode) light bar, but is not limited thereto.

According to the above descriptions of the backlight unit 6, this embodiment may enable the user to simply change the location where the backlight unit 6 is installed by mounting the light guiding structure 63 and the light emitting structure 64 to the removable back cover structure 62. In addition, the backlight unit 6 has a relatively simple structure and a relatively small size, thereby facilitating manufacturing. Note that the backlight unit 6 may employ bottom type backlight techniques by adjusting implementations of the light guiding structure 63 and the light emitting structure 64 in other embodiments, and the present invention should not be limited to edge type backlight techniques that are used in this embodiment.

Further referring to FIGS. 5, 7, 8 and 11, since the backlight unit 6 of this embodiment is designed to be removable, this embodiment enables engagement of the backlight unit 6 using the grooves 623 of the back cover structure 62, the fixing structure 622, and the positioning portions 416, the front groove 417 and the rear groove 418 (see FIG. 6) of the frame body 41. The user may install the backlight unit 6 by the steps of: aligning the grooves 623 (see FIG. 6) of the back cover structure 62 with the positioning portions 416 at the top part of the frame body 41; engaging the grooves 623 with the positioning portions 416 for positioning; and engaging the hook-shaped fixing structure 622, which is slightly flexible, with the front groove 417 or the rear groove 418, so as to complete installation and positioning of the backlight unit 6. In addition to the abovementioned structural design, this embodiment may provide further positioning after installation of the backlight unit 6 by virtue of the magnetic unit 7.

In detail, the magnetic unit 7 may be made of magnets or a ferromagnetic metal, and includes a plurality of backlight magnetic structures 71, a plurality of front display surface magnetic structures 72 and a plurality of rear display surface magnetic structures 73. The backlight magnetic structures 71 are disposed on outer edges of the backlight unit 6 at a side corresponding to the light exit surface 61. Arrangement of the backlight magnetic structures 71 corresponds to those of the front display surface magnetic structures 72 and the rear display surface magnetic structures 73 for enabling engagement by magnetic attraction. The front display surface magnetic structures 72 are disposed on the screen frame 4 at the front side, and are configured to engage the backlight magnetic structures 71 by magnetic attraction when the backlight unit 6 is at the front frame surface location. The rear display surface magnetic structures 73 are disposed on the screen frame 4 at the rear side, and are configured to engage the backlight magnetic structures 71 by magnetic attraction when the backlight unit 6 is at the rear frame surface location. Accordingly, the backlight unit 6 of this embodiment may be firmly fixed to the screen frame 4 using not only the aforementioned mechanical engagement structure (i.e., the fixing structure 622, the front groove 417, the rear groove 418, etc.), but also the magnetic unit 7 that employs magnetic attraction. In addition to the mechanical engagement structure and the magnetic unit 7, the embodiment may further provide different engaging and positioning function by using, for example, a draw key or a tenon mechanism, between the backlight unit 6 and the screen frame 4, and the present invention should not be limited to the embodiments disclosed herein.

Referring to FIGS. 3, 5, 7 and 8, in addition to the screen frame 4, the liquid crystal unit 5, the backlight unit 6 and the magnetic unit 7, the embodiment further uses the sensing unit 8 that detects the location where the backlight unit 6 is installed relative to the liquid crystal unit 5 or the screen frame 4 (i.e., the front frame surface location or the rear frame surface location), and that permits provision of electrical power to the backlight unit 6 via the sensing unit 8.

Figure 8:
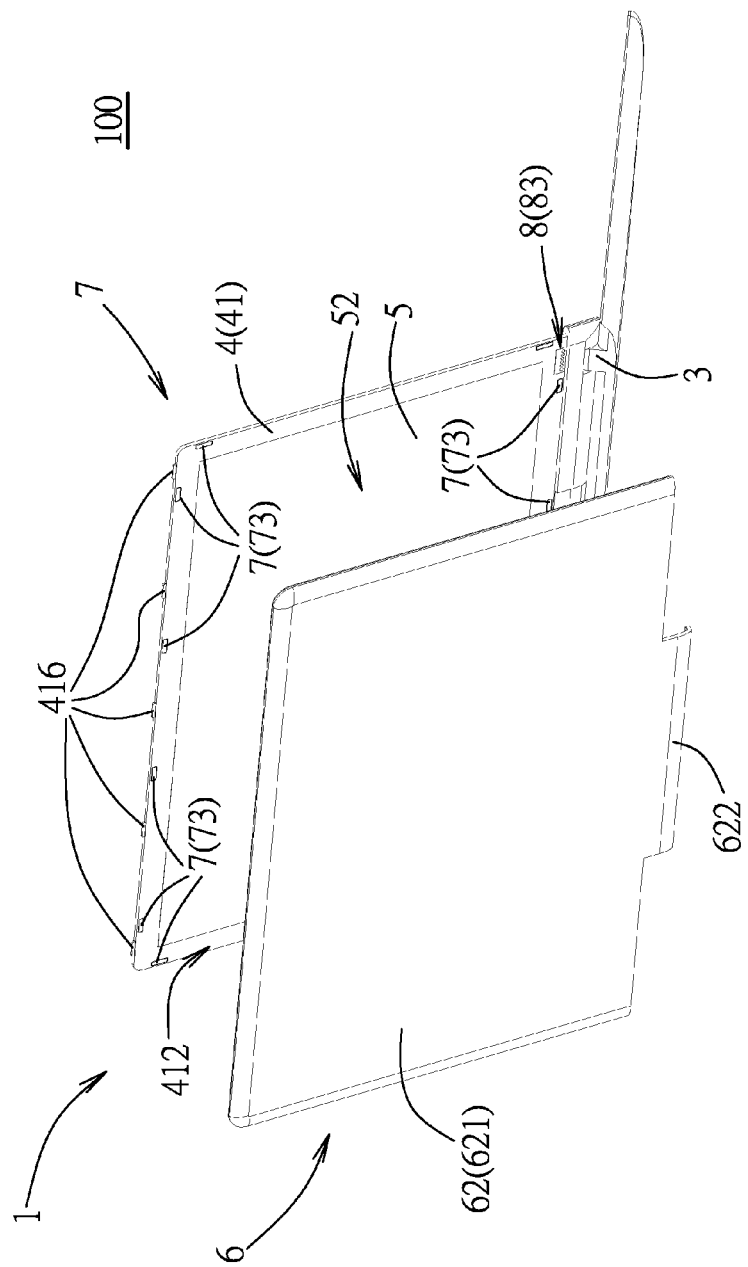
FIG. 8 is a partly exploded view with a viewing angle different from that of FIG. 7.

In detail, the sensing unit 8 includes a backlight sensing component 81, a front display surface sensing component 82 and a rear display surface sensing component 83. The backlight sensing component 81 is disposed on the back cover structure 62 of the backlight unit 6 at aside corresponding to the light exit surface 61, and is disposed in correspondence to the front display surface sensing component 82 and the rear display surface sensing component 83. In this embodiment, the backlight sensing component 81 is disposed at, but not limited to, a lower-left corner of the backlight unit 6 at the side corresponding to the light exit surface 61. The front display surface sensing component 82 is disposed on the screen frame 4 at the front side. In this embodiment, the front display surface sensing component 82 is disposed at a lower-right corner of the screen frame 4, and is configured to make electrical connection with the backlight sensing component 81 when the backlight unit 6 is at the front frame surface location (i.e., the second display state, as shown in FIG. 9), so that presence of the backlight unit 6 at the front frame surface location is sensed and so as to permit provision of electrical power to the backlight unit 6 via the front display surface sensing component 82. The rear display surface sensing component 83 is disposed on the screen frame 4 at the rear side. In this embodiment, the rear display surface sensing component 83 is disposed at a lower-right corner of the screen frame 4, and is configured to make electrical connection with the backlight sensing component 81 when the backlight unit 6 is at the rear frame surface location (i.e., the first display state, as shown in FIG. 8), so that presence of the backlight unit 6 at the rear frame surface location is sensed and so as to permit provision of electrical power to the backlight unit 6 via the rear display surface sensing component 83.

In this embodiment, the front display surface sensing component 82 and the rear display surface sensing component 83 are implemented using pogo pin connectors, and are electrically connected to the operation module 2 of the electronic device 100. Each of the components 83, 82 permits provision of electrical power to the backlight unit 6 when the backlight sensing component 81 that is disposed on the backlight unit 6 is electrically connected thereto in a respective one of the first and second display states, and transmits a sensed signal to the operation module 2. The operation module 2 then outputs a control signal to the liquid crystal unit 5 for causing a corresponding one of the front display surface 51 and the rear display surface 52 to display images. However, implementation of the sensing unit 8 may be adjusted as required, and is not limited to what is disclosed herein.

Figure 3:
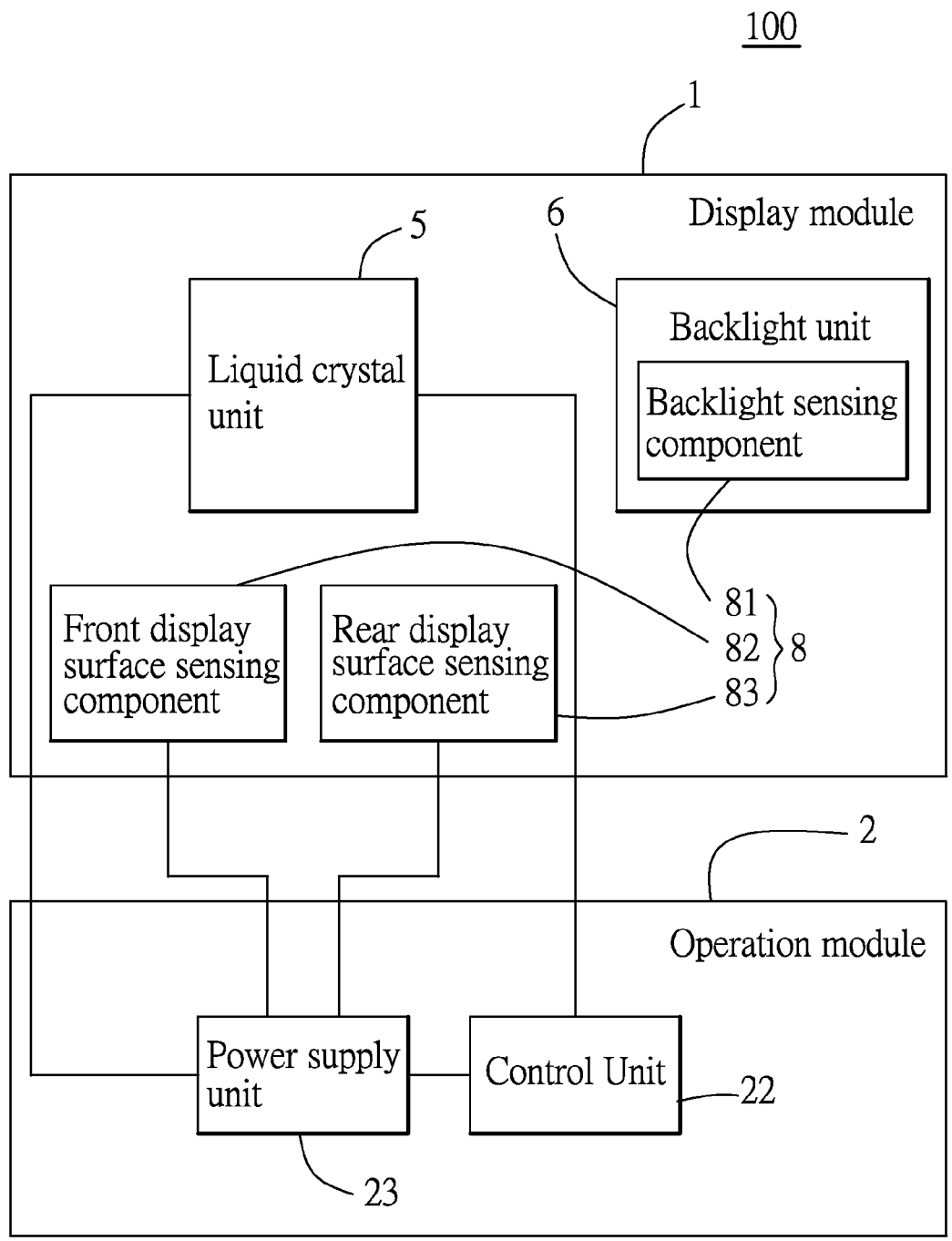
FIG. 3 is a schematic diagram illustrating component arrangement of the electronic device according to the present invention.
Figure 4:
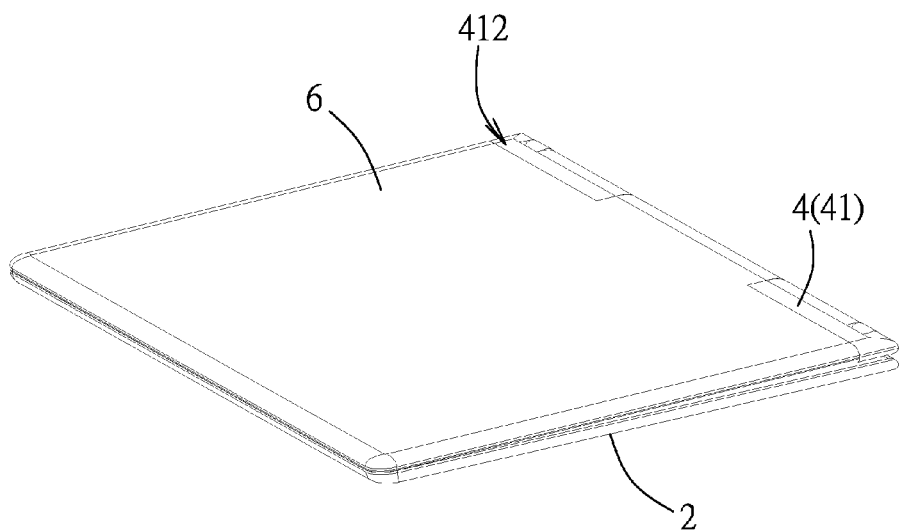
FIG. 4 is a schematic diagram showing a configuration of the first embodiment in the first display state.
Figure 14:
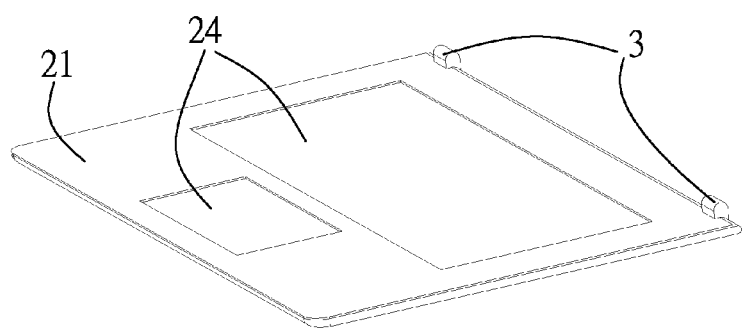
FIG. 14 is a perspective view showing an implementation of an operation module of the first embodiment.
Figure 15:
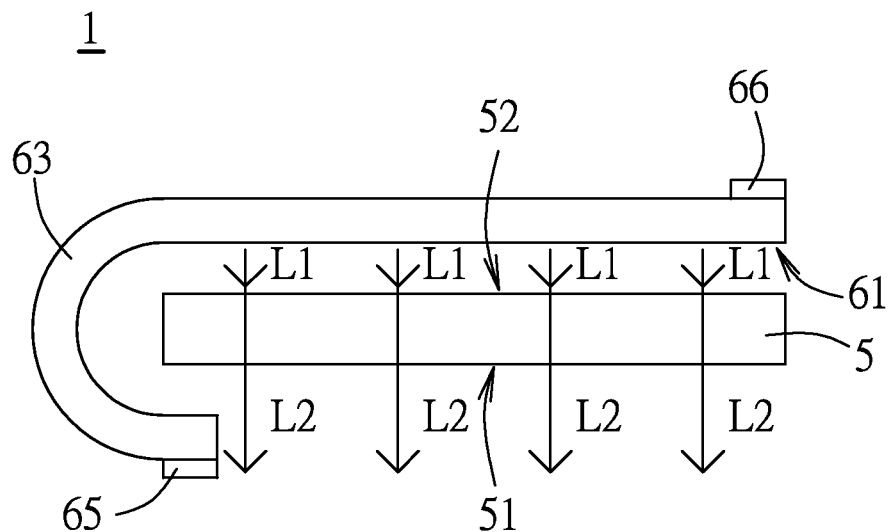
FIG. 15 is a schematic diagram illustrating a first display state of a display module of a second embodiment of an electronic device according to the present invention.
Figure 16:
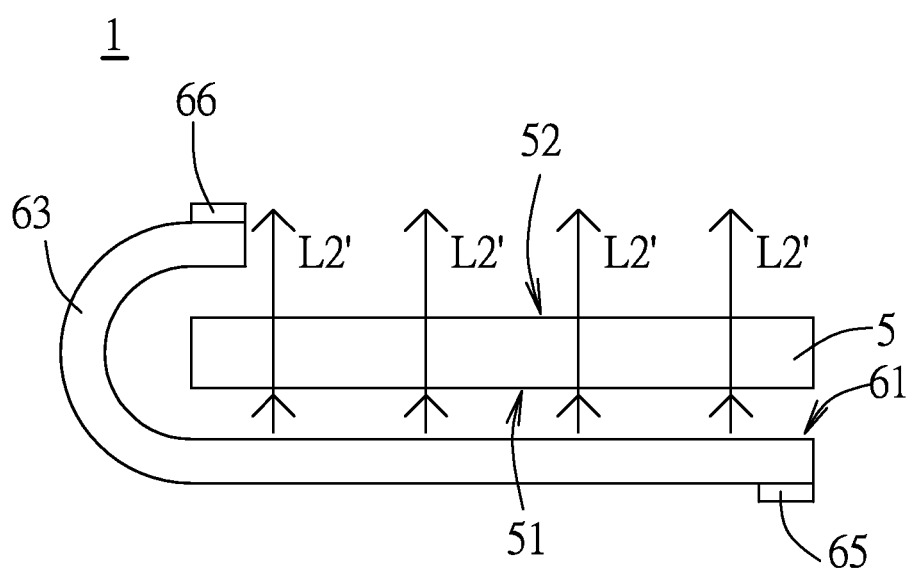
FIG. 16 is a schematic diagram illustrating a second display state of the display module of the second embodiment.

Referring to FIGS. 3, 7 and 14, the operation module 2 includes a shell 21, a control unit 22, a power supply unit 23 and an input interface 24. The shell 21 is configured for receiving the control unit 22 and the power supply unit 23 therein, and for disposing the display module 1, the connecting mechanism 3 and the input interface 24 thereon. The power supply unit 23 is electrically connected to the control unit 22, the front display surface sensing component 82, the rear display surface sensing component 83 and the liquid crystal unit 5 for provision of electrical power thereto, and may provide electrical power to the backlight unit 6 after electrical connection is made between the backlight sensing component 81 and one of the front display surface sensing component 82 and the rear display surface sensing component 83. The control unit 22 is electrically connected to the power supply unit 23 and the liquid crystal unit 5, and controls the display module 1 to display images on the rear display surface 52 when the light exit surface 61 of the backlight unit 6 faces toward the front display surface 51 of the liquid crystal unit 5 (i.e., the backlight unit 6 is at the front frame surface location), and controls the display module 1 to display images on the front display surface 51 when the light exit surface 61 of the backlight unit 6 faces toward the rear display surface 52 of the liquid crystal unit 5 (i.e., the backlight unit 6 is at the rear frame surface location). The connecting mechanism 3 interconnects the display module 1 and the operation module 2, so as to enable movement of the display module 1 relative to the operation module 2. In this embodiment, the connecting mechanism 3 enables rotation of the display module 1 relative to the operation module 2 so as to open or close the electronic device 100.

Therefore, the electronic device 100 of this embodiment may allow the user to operate at the front side or the rear side of the display module 1 by switching the display module 1 between the first display state in which the images are displayed using the front display surface 51, or the second display state in which the images are displayed using the rear display surface 52.

Referring to FIGS. 15 to 18 and 22, the second embodiment of the electronic device 100 according to the present invention is also capable of switching display of images between the first and second display states like the first embodiment, so as to operate as a notebook computer or a tablet computer. The second embodiment primarily differs from the first embodiment in that: in the first embodiment, change in the location of the light exit surface 61 of the backlight unit 6 is achieved by the user dissembling the whole backlight unit 6 and assembling the same at another frame surface location, whereas in the second embodiment, only apart of the backlight unit 6 is movably disposed at a front frame surface location which corresponds to the front frame surface 411, or a rear frame surface location which corresponds to the rear frame surface 412, such that the light exit surface 61 faces toward the front display surface 51 (see FIG. 16) or the rear display surface 52 (see FIG. 15) of the liquid crystal unit 5, to thereby enable switching of the display state. In this embodiment, the display surface corresponding to the light exit surface 61 of the backlight unit 6 is switched by sliding the light guiding structure 63 of the backlight unit 6 between the front frame surface location and the rear frame surface location along the screen frame 4, so as to switch the display state of the display module 1 and the operation mode of the electronic device 100.

In detail, the electronic device 100 of this embodiment also includes a display module 1, an operation module 2 and a connecting mechanism 3 interconnecting the display module 1 and the operation module 2. The display module 1 includes a screen frame 4, a liquid crystal unit 5, a backlight unit 6, a magnet unit 7 and a sensing unit 8.

Figure 17:
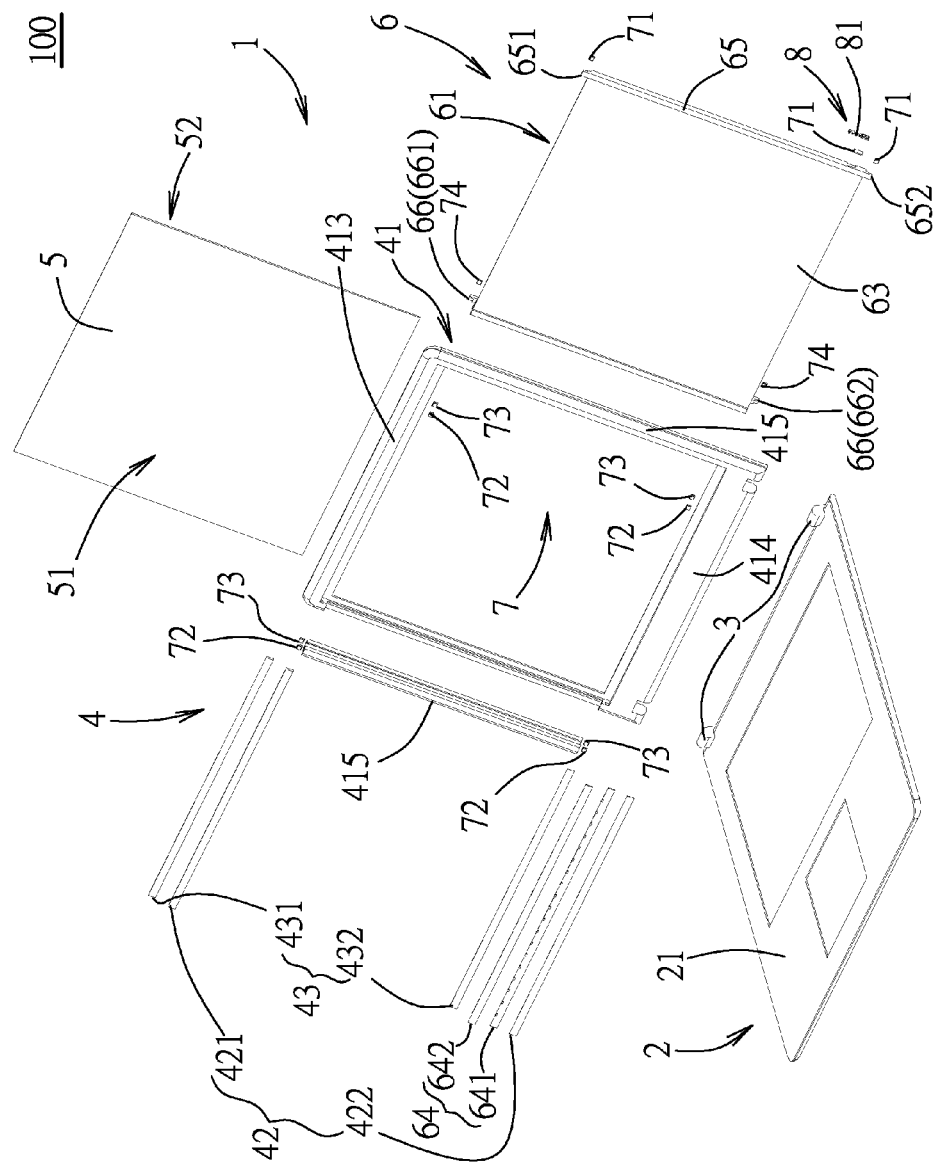
FIG. 17 is a perspective exploded view illustrating an implementation of the display module and an operation module of the second embodiment.
Figure 18:
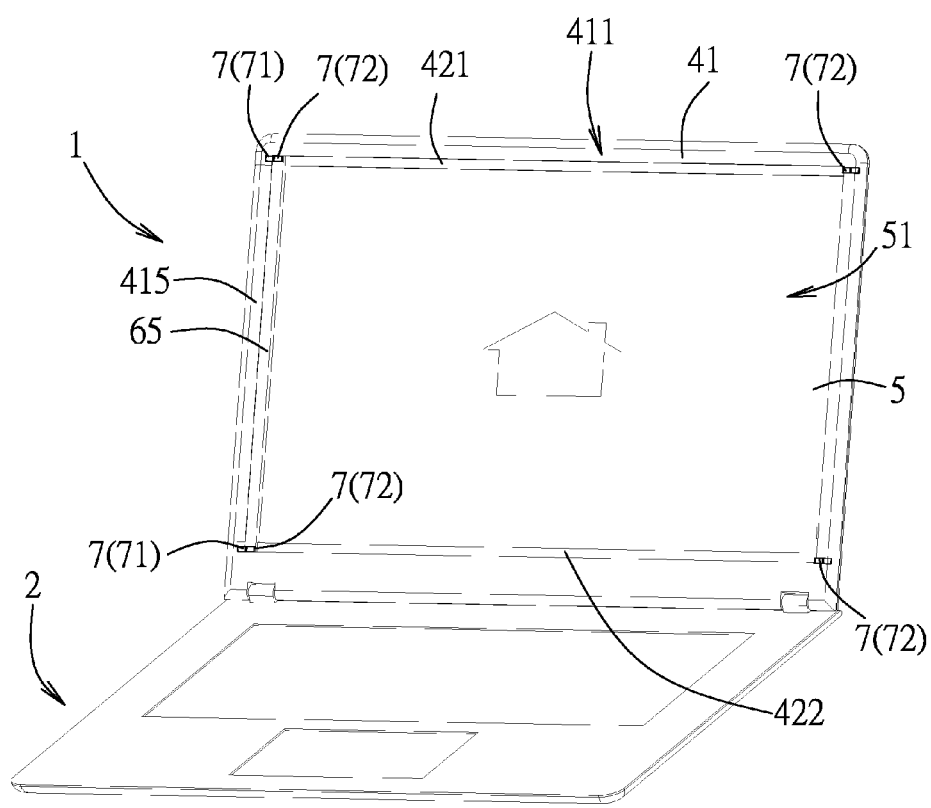
FIG. 18 is a perspective view illustrating a configuration of the second embodiment in the first display state.

In this embodiment, the screen frame 4 includes a frame body 41, a front guiding structure 42 and a rear guiding structure 43. The frame body 41 has a top frame portion 413, a bottom frame portion 414 spaced apart from the top frame portion 413, and two spaced-apart side frame portions 415 respectively interconnecting the top frame portion 413 and the bottom frame portion 414. The top frame portion 413, the bottom frame portion 414 and the side frame portions 415 cooperate to define the frame body 41 that serves as a main structure of the screen frame 4 for disposing the liquid crystal unit 5, the backlight unit 6, the magnetic unit 7 and the sensing unit 8 thereon. In this embodiment, one of the side frame portions 415 (e.g., the left one of the side frame portions 415, as shown in FIG. 17) is separable from the top frame portion 413 and the bottom frame portion 414, so that an opening is formed on the frame body 41 after this side frame portion 415 is disassembled, thereby facilitating assembly of the backlight unit 6 on the frame body 41.

The front guiding structure 42 is disposed on the front frame surface 411 of the frame body 41, and includes a first upper horizontal track 421 and a first lower horizontal track 422. The first upper horizontal track 421 is shaped as a bar that extends horizontally, and is disposed on the front frame surface 411 at the top frame portion 413. The first lower horizontal track 422 is also shaped as a bar that extends horizontally, and is disposed on the front frame surface 411 at the bottom frame portion 414. The first upper horizontal track 421 and the first lower horizontal track 422 are respectively disposed at top and bottom sides of the light guiding structure 63 of the backlight unit 6 when the light guiding structure 63 is at the front frame surface location, such that the light guiding structure 63 is slidable along the first upper horizontal track 421 and the first lower horizontal track 422.

The rear guiding structure 43 is disposed on the rear frame surface 412 of the frame body 41, and includes a second upper horizontal track 431 and a second lower horizontal track 432. The second upper horizontal track 431 extends horizontally, and is disposed on the rear frame surface 412 at the top frame portion 413. The second lower horizontal track 432 extends horizontally, and is disposed on the rear frame surface 412 at the bottom frame portion 414. The second upper horizontal track 431 and the second lower horizontal track 432 are respectively disposed at the top and bottom sides of the light guiding structure 63 of the backlight unit 6 when the light guiding structure 63 is at the rear frame surface location, such that the light guiding structure 63 is slidable along the second upper horizontal track 431 and the second lower horizontal track 432.

Due to a different operating principle of the backlight unit 6, the backlight unit 6 of this embodiment has a different structure compared to the backlight unit 6 of the first embodiment, and includes a light guiding structure 63, a light emitting structure 64, a front pull structure 65 and a rear pull structure 66.

In this embodiment, the light guiding structure 63 is made of a flexible material (e.g., polyvinyl chloride, etc.), has a width greater than that of one of the front display surface 51 and the rear display surface 52, and is deformably slidable between the front frame surface location and the rear frame surface location along the front guiding structure 42 and the rear guiding structure 43.

Referring to FIGS. 15, 18, 19 and 20, when the light exit surface 61 of the light guiding structure 63 faces toward the rear display surface 52 of the liquid crystal unit 5 (i.e., at the rear frame surface location) such that the display module 1 operates in the first display state, the light guiding structure 63 has a portion that extends around a side of the liquid crystal unit 5 to a location adjacent to the front display surface 51, and receives light emitted by the light emitting structure 64 to emit the backlight beam L1. The liquid crystal unit 5 then receives and converts the backlight beam L1 into the image beam L2, so as to display images on the front display surface 51.

Referring to FIGS. 16, 17, and 21 to 23, after the flexible light guiding structure 63 slides horizontally due to user operation via the front pull structure 65 or the rear pull structure 66, the light exit surface 61 of the light guiding structure 63 faces toward the front display surface 51 of the liquid crystal unit 5 (i.e., at the front frame surface location) such that the display module 1 is switched to the second display state. In this state, the light guiding structure 63 has another portion that extends around the side of the liquid crystal unit 5 to a location adjacent to the rear display surface 52, and emits the backlight beam L1 toward the front display surface 51. The liquid crystal unit 5 then receives and converts the backlight beam L1 into the image beam L2', so as to display images on the rear display surface 52.

Moreover, in this embodiment, the light emitting structure 64 of the backlight unit 6 is different from that of the first embodiment. The light emitting structure 64 of the embodiment includes a front light emitting component 641 and a rear light emitting component 642. The front light emitting component 641 is disposed on the bottom frame portion 414 at a location corresponding to the front frame surface 411, and emits light toward the light guiding structure 63 when the light guiding structure 63 is at the front frame surface location, to thereby serve as a light source when the display module 1 operates in the second display state. The rear light emitting component 642 is disposed on the bottom frame portion 414 at a location corresponding to the rear frame surface 412, and emits light toward the light guiding structure 63 when the light guiding structure 63 is at the rear frame surface location, to thereby serve as a light source when the display module 1 operates in the first display state. In other words, the backlight unit 6 of this embodiment includes the front light emitting component 641 and the rear light emitting component 642 at bottom parts of the front frame surface 411 and the rear frame surface, respectively, to serve as a light source after the light guiding structure 63 slides to a respective one of the front frame surface location and the rear frame surface location. Each of the front light emitting component 641 and the rear light emitting component 642 is a light bar that has a length close to a respective one of the first lower horizontal track 422 and the second lower horizontal track 432, is mounted to the bottom frame portion 414 of the frame body 41 at a corresponding one of the front side and the rear side relative to the liquid crystal unit 5 for disposing the respective one of the first lower horizontal track 422 and the second lower horizontal track 432 thereon, and faces toward a bottom side of the light guiding structure 63 when the light guiding structure 63 is at the corresponding location. Each of the front light emitting component 641 and the rear light emitting component 642 is configured to emit light when the light guiding structure 63 is at a corresponding one of the front frame surface location and the rear frame surface location, so that light enters the light guiding structure 63 from the bottom side thereof, enabling the light guiding structure 63 to provide the backlight beam to the liquid crystal unit 5 via the light exit surface 61. In other implementations, locations of the front light emitting component 641 and the rear light emitting component 642 may be adjusted as required. As an example, the front light emitting component 641 and the rear light emitting component 642 may be disposed on the top frame portion 413 of the frame body 41, and are also capable of providing light to the light guiding structure 63.

In addition to the structural differences of the light guiding structure 63 and the light emitting structure 64, this embodiment further includes the front pull structure 65 and the rear pull structure 66 at the same side of the liquid crystal unit 5, respectively, for facilitating sliding of the light guiding structure 63.

Referring to FIGS. 15 to 18 and 20, the front pull structure 65 is disposed at a side edge of the light guiding structure 63 at a side that is opposite to the light exit surface 61 and that corresponds to the front display surface 51, extends vertically, and has a first upper extending end portion 651 slidably engaging the first upper horizontal track 421, and a first lower extending end portion 652 slidably engaging the first lower horizontal track 422. The first upper extending end portion 651 and the first lower extending end portion 652 are respectively received in the top frame portion 413 and the bottom frame portion 414 for positioning and guiding during movement of the light guiding structure 63. Furthermore, a part of the front pull structure 65 is exposed and is accessible for facilitating pulling by the user. The rear pull structure 66 is disposed at another side edge of the light guiding structure 63 at the side that is opposite to the light exit surface 61 and that corresponds to the rear display surface 52, extends vertically, and has a second upper extending end portion 661 slidably engaging the second upper horizontal track 431, and a second lower extending end portion 662 slidably engaging the second lower horizontal track 432. The second upper extending end portion 661 and the second lower extending end portion 662 are respectively and partly received in the top frame portion 413 and the bottom frame portion 414 for positioning and guiding during movement of the light guiding structure 63. Furthermore, a part of the rear pull structure 66 is exposed and is accessible for facilitating pulling by the user from the rear side of the display module 1. Referring to FIGS. 15 and 17 to 20, when the display module 1 operates in the first display state, the light guiding structure 63 is disposed in correspondence to the rear display surface 52 of the liquid crystal unit 5 (i.e., at the rear frame surface location), and covers the whole rear display surface 52. At this time, the front pull structure 65, which is disposed at the side edge of the light guiding structure 63, is located at the left of the front display surface 51 (see FIG. 18), and abuts against the separable side frame portion 415. The rear pull structure 66, which is disposed at another side edge of the light guiding structure 63, is located at the left of the rear display surface 52 (see FIG. 20), and abuts against the fixed side frame portion 415. If the user intends to switch the display state of the display module 1 under this condition, the user may apply force to the front pull structure 65 or the rear pull structure 66, to thereby move the same toward the distal one of the side frame portions 415, and bring about sliding movement of the light guiding structure 63.

Referring to FIGS. 16, 17 and 21 to 23, after the sliding movement of the light guiding structure 63, each of the front pull structure 65 and the rear pull structure 66 abuts against a respective one of the side frame portions 415 from which the front/rear pull structure 65, 66 is originally distal, the light exit surface 61 of the light guiding structure 63 faces toward the front display surface 51 of the liquid crystal unit 5 (i.e., the light guiding structure 63 is at the front frame surface location), and the display module 1 operates in the second display state.

During the abovementioned switching of the display state, the light guiding structure 63 may be positioned by magnetic attraction using the magnetic unit 7 as illustrated in the first embodiment, and the location of the light guiding structure 63 relative to the screen frame 4 and the liquid crystal unit 5 (i.e., the front frame surface location or the rear frame surface location) may be detected using the sensing unit 8.

In this embodiment, the magnetic unit 7 includes a plurality of backlight magnetic structures 71, a plurality of front display surface magnetic structures 72, a plurality of rear display surface magnetic structures 73 and a plurality of backlight magnetic structures 74. The backlight magnetic structures 71, are disposed on the light guiding structure 63 respectively at the rear side and the front side of the light exit surface 61, and are respectively disposed at four corners of the two opposite surfaces of the light guiding structure 63 that respectively correspond to the front display surface magnetic structures 72 and the rear display surface magnetic structures 73, which are respectively disposed at four corners of the front frame surface 411 and the rear frame surface 412 of the frame body 41. After sliding movement of the light guiding structure 63, the front display surface magnetic structures 72 and the rear display surface magnetic structures 73 engage the corresponding backlight magnetic structures 71 or 74 by magnetic attraction, thereby fixing the light guiding structure 63. In other implementations, the front display surface magnetic structures 72 and the rear display surface magnetic structures 73 may be disposed on the first upper horizontal track 421, the first lower horizontal track 422, the second upper horizontal track 431, and the second lower horizontal track 432 for engaging the backlight magnetic structures 71, 74 and fixing the light guiding structure 63.

Figure 19:
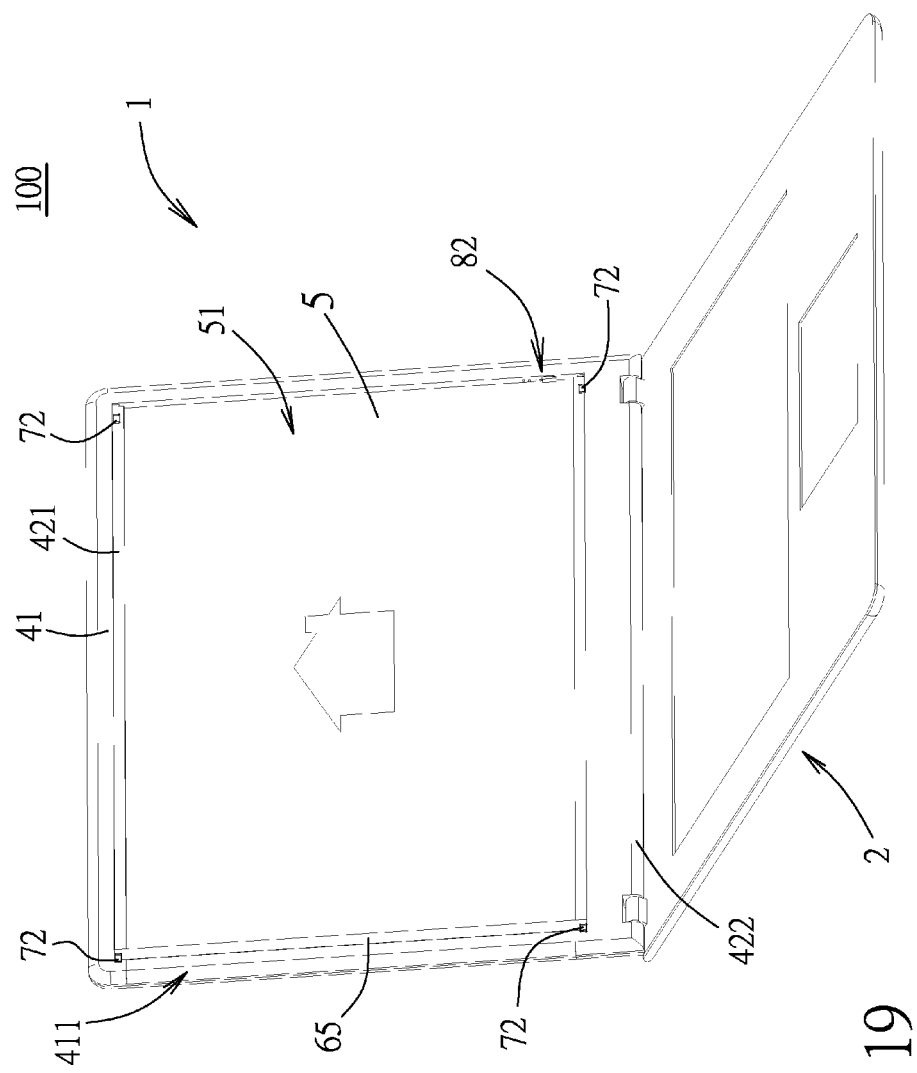
FIGS. 19 and 20 are perspective views showing the second embodiment from different viewing angles.
Figure 20:
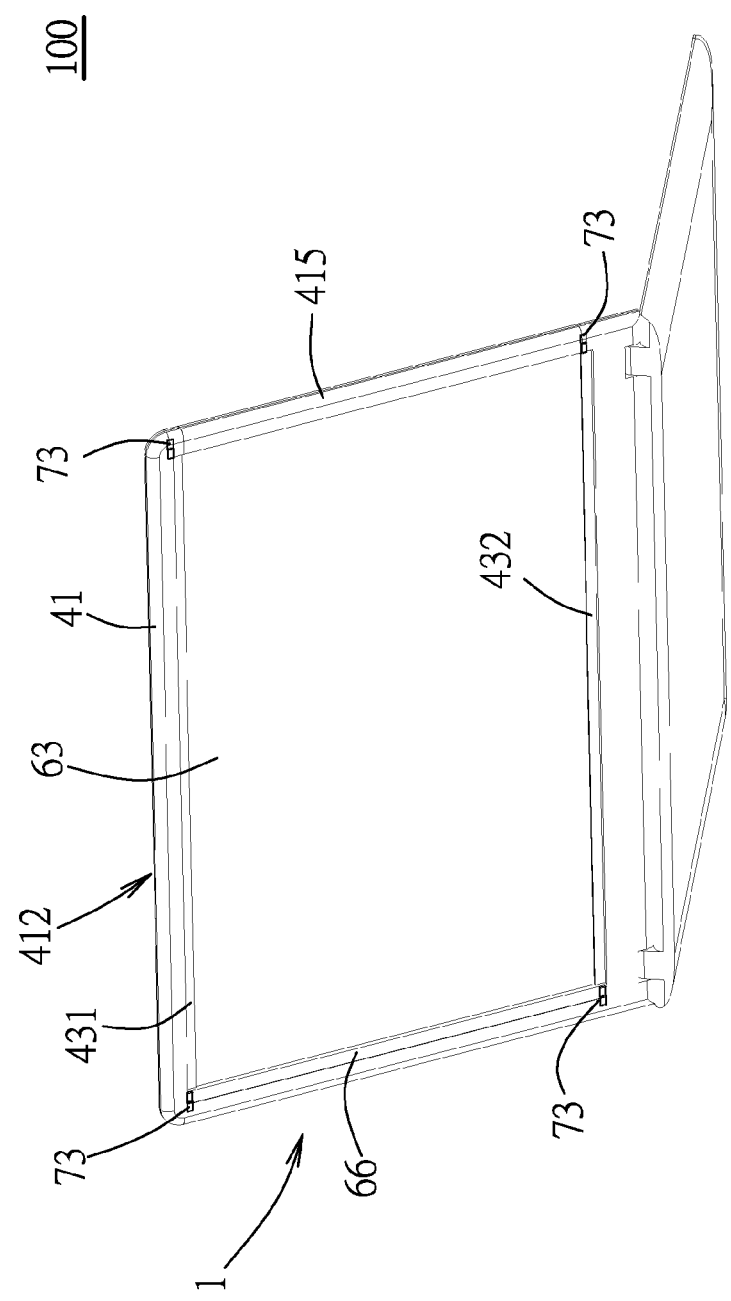
Figure 21:
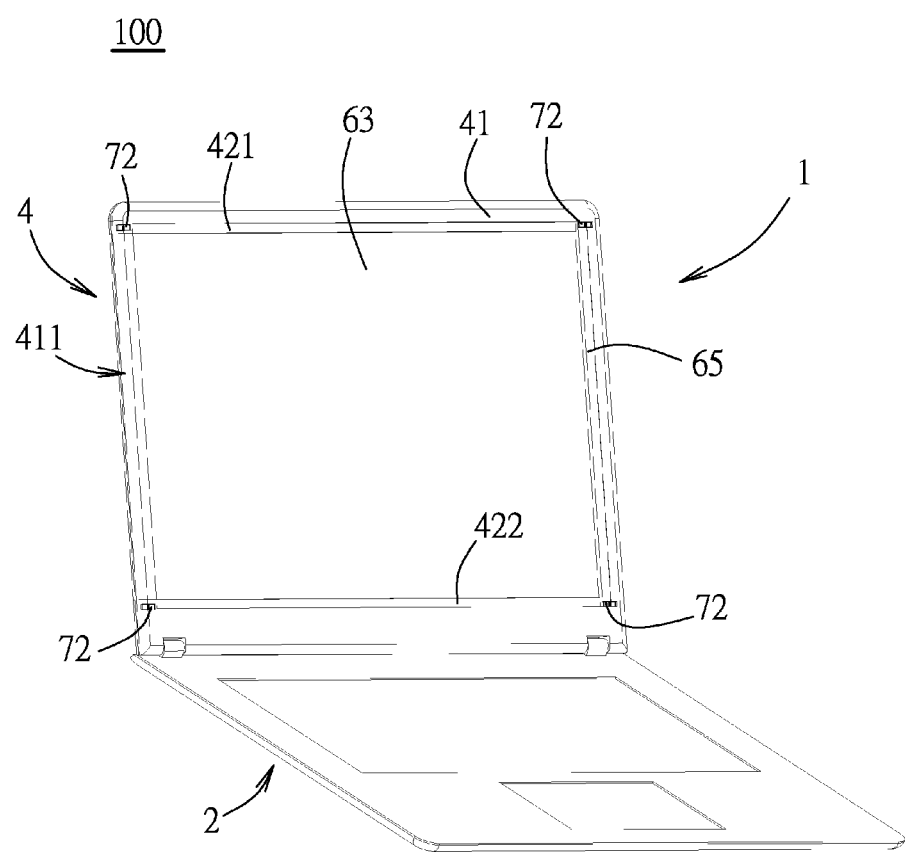
FIG. 21 is a perspective view illustrating a configuration of the second embodiment in the second display state.
Figure 22:
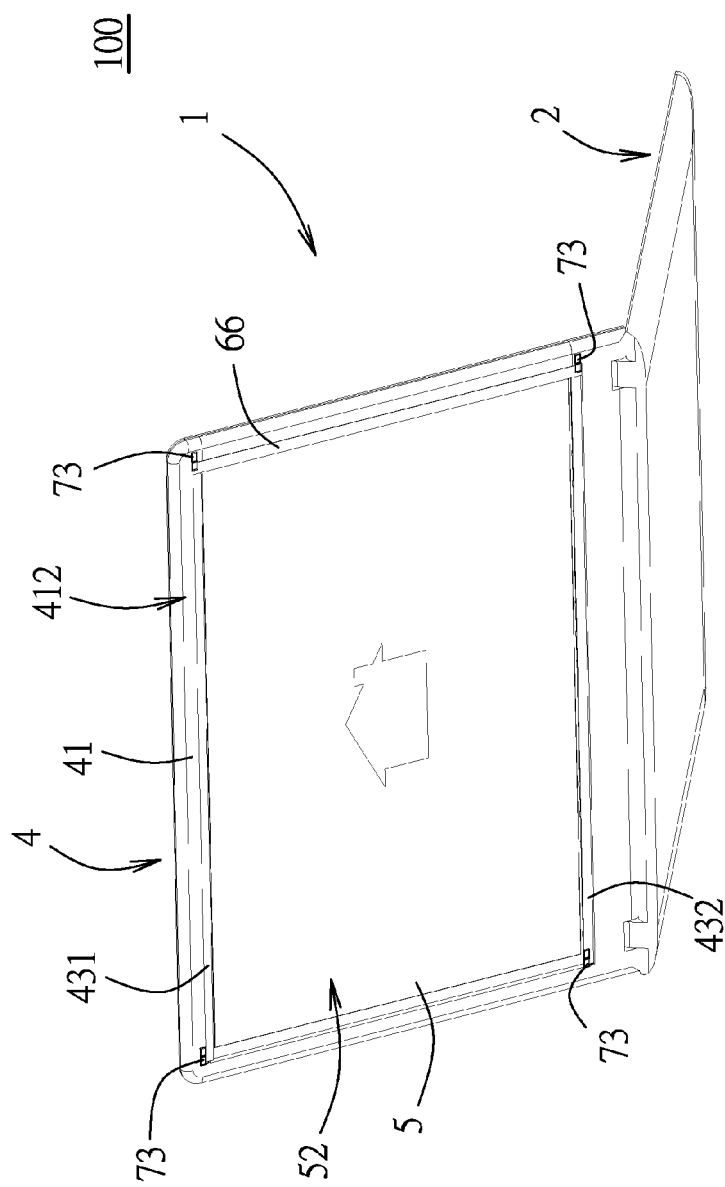
FIG. 22 is a perspective view with a viewing angle different from that of FIG. 21.
Figure 23:
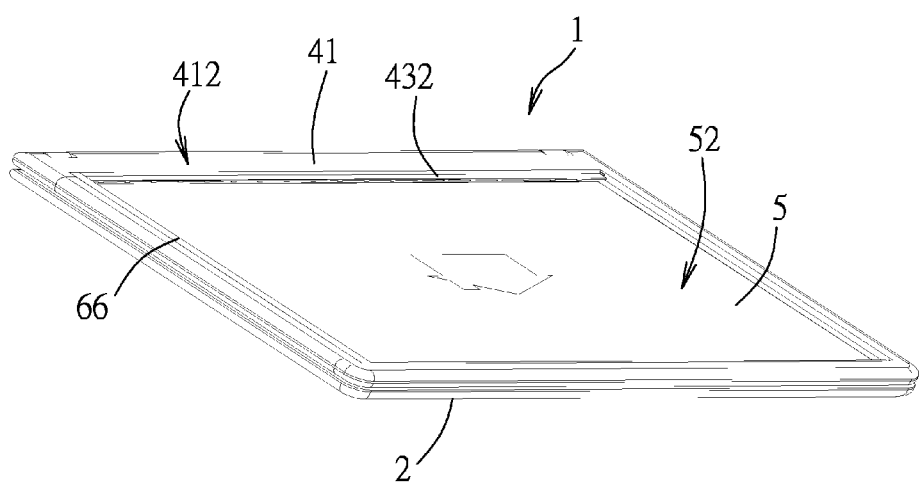
FIG. 23 is a perspective view illustrating another configuration of the second embodiment in the second display state.

Referring to FIGS. 17, 19 and 21, the sensing unit 8 includes a backlight sensing component 81, a front display surface sensing component 82 and a rear display surface sensing component (not shown), which are disposed correspondingly, and which may be implemented using the pogo pin connectors as illustrated in the first embodiment, for detecting the location of the movable portion of the backlight unit 6, which is the light guiding structure 63 in the second embodiment. For example, in this embodiment, the backlight sensing component 81 is disposed at the front pull structure 65, the front display surface sensing component 82 is disposed at the fixed side frame portion 415 (the right one) of the frame body 41, and the rear display surface sensing component is disposed at the separable side frame portion 415 (the left one) of the frame body 41. When the display module 1 operates in the first display state as shown in FIG. 19, the light exit surface 61 of the backlight unit 6 faces toward the rear display surface 52 of the liquid crystal unit 5, and the front pull structure 65 is positioned in correspondence to the separable side frame portion 415. At this time, the backlight sensing unit 81 makes electrical connection with the rear display surface sensing component, thereby causing the rear light emitting component 642 to emit light, so that the light guiding structure 63, which is at the rear frame surface location, provides the backlight beam to the rear display surface 52. When the display module 1 operates in the second display state as shown in FIG. 21, the light exit surface 61 of the backlight unit 6 faces toward the front display surface 51 of the liquid crystal unit 5, and the front pull structure 65 is positioned in correspondence to the fixed side frame portion 415. At this time, the backlight sensing unit 81 makes electrical connection with the front display surface sensing component 82, thereby causing the front light emitting component 641 to emit light, so that the light guiding structure 63, which is at the front frame surface location, provides the backlight beam to the front display surface 51. However, implementations of the sensing unit 8 of this invention are not limited to the abovementioned embodiment, and may be adjusted as required.

To conclude, the present invention may allow the user to simply switch the display module 1 between the first display state and the second display state by disassembling the whole backlight unit 6 or using a partly slidable backlight unit 6, so as to operate the electronic device 100 as a notebook computer or a tablet computer, thereby enhancing flexibility and convenience in use. In addition, the display module 1 has a simple structure and is easy to assemble, enabling the electronic device 100 to have a relatively small size and a relatively low manufacturing cost, and thereby facilitating production.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A display module comprising:
    a screen frame including a frame body that has a front frame surface facing toward a front side, and that has a rear frame surface opposite to said front frame surface and facing toward a rear side;
    a liquid crystal unit that has a front display surface and a rear display surface, that is configured to display an image on one of said front display surface and said rear display surface, and that is mounted to said screen frame, said front display surface being exposed from said screen frame and facing toward the front side, said rear display surface being exposed from said screen frame and facing toward the rear side;
    a backlight unit having a light exit surface, and configured to emit light from said light exit surface, said backlight unit having a movable portion that is movably disposed on said screen frame and that is movable between a front frame surface location at which said light exit surface faces toward said front display surface of said liquid crystal unit, and a rear frame surface location at which said light exit surface faces toward said rear display surface; and
    a sensing unit configured to sense whether said movable portion of said backlight unit is at the front frame surface location or at the rear frame surface location, and to permit provision of power to said backlight unit via said sensing unit.

2. The display module as claimed in claim 1, wherein said sensing unit includes:
    a backlight sensing component disposed on said movable portion of said backlight unit;
    a front display surface sensing component disposed on said screen frame at the front side of said screen frame, and configured to make electrical connection with said backlight sensing component when said movable portion of said backlight unit is at the front frame surface location, so that presence of said movable portion at the front frame surface location is sensed and so as to permit provision of power to said backlight unit via said front display surface sensing component; and
    a rear display surface sensing component disposed on said screen frame at the rear side of said screen frame, and configured to make electrical connection with said backlight sensing component when said movable portion of said backlight unit is at the rear frame surface location, so that presence of said movable portion at the rear frame surface location is sensed and so as to permit provision of power to said backlight unit via said rear display surface sensing component.

3. The display module as claimed in claim 1, wherein said sensing unit includes:
    a backlight sensing component disposed on said movable portion of said backlight unit;
    a front display surface sensing component disposed on said screen frame, and configured to make electrical connection with said backlight sensing component when said movable portion of said backlight unit is at the front frame surface location, so that presence of said movable portion at the front frame surface location is sensed; and
    a rear display surface sensing component disposed on said screen frame, and configured to make electrical connection with said backlight sensing component when said movable portion of said backlight unit is at the rear frame surface location, so that presence of said movable portion at the rear frame surface location is sensed.

4. The display module as claimed in claim 1, wherein said backlight unit includes:
    a back cover structure including a cover body and a fixing structure, said cover body being formed with a groove, said fixing structure extending from an edge of said cover body, and having a hook end that bends toward said liquid crystal unit;
    a light guiding structure mounted to said back cover structure, configured for light transmission, and formed with said light exit surface opposite to said back cover structure; and
    a light emitting structure mounted to said back cover structure, and configured to emit light toward said light guiding structure; and
    wherein said frame body further has:
    a positioning portion removably extended into said groove of said cover body;
    a front groove formed in said front frame surface of said frame body, and configured to engage removably said fixing structure of said back cover structure; and
    a rear groove formed in said rear frame surface of said frame body, and configured to engage removably said fixing structure of said back cover structure.

5. The display module as claimed in claim 4, wherein said groove of said cover body is formed at a top part of said cover body and opens downward, said fixing structure is disposed at a bottom part of said cover body, said positioning portion extends upwardly from said frame body, said front groove is formed in said front frame surface at a bottom part thereof, and said rear groove is formed in said rear frame surface at a bottom part thereof.

6. The display module as claimed in claim 1, further comprising a magnetic unit including:
    a backlight magnetic structure disposed on said movable portion of said backlight unit;
    a front display surface magnetic structure disposed on said screen frame at the front side of said screen frame, and configured to engage said backlight magnetic structure by magnetic attraction when said movable portion of said backlight unit is at the front frame surface location; and a rear display surface magnetic structure disposed on said screen frame at the rear side of said screen frame, and configured to engage said backlight magnetic structure by magnetic attraction when said movable portion of said backlight unit is at the rear frame surface location.

7. The display module as claimed in claim 1, wherein:

said liquid crystal unit includes a first optical structure, a liquid crystal component, a second optical structure, and a light shielding structure;

said first optical structure is spaced apart from said second optical structure, and corresponds to said front display surface;

said liquid crystal component is disposed between said first optical structure and said second optical structure;

said second optical structure corresponds to said rear display surface, and includes a substrate and a conductive component disposed on said substrate for transmission of electrical signals that serve to set a light transmission characteristic of said liquid crystal component;

said light shielding structure includes a first shielding layer and a second shielding layer, said first shielding layer being opaque and being disposed in correspondence to said conductive component, said second shielding layer being opaque and being disposed in correspondence to said conductive component, said conductive component being disposed between said first shielding layer and said second shielding layer.

8. The display module as claimed in claim 1, wherein said liquid crystal unit includes a touch sensing structure that is disposed in correspondence to one of said front display surface and said rear display surface for enabling touch control by a user.

9. An electronic device comprising:

a display module as claimed in claim 1; and an operation module electrically coupled to said display module for providing electrical power thereto, and configured to control said display module to display the image on said rear display surface when said movable portion of said backlight unit is at the front frame surface location, and to display the image on said front display surface when said movable portion of said backlight unit is at the rear frame surface location.

10. The electronic device as claimed in claim 9, further comprising a connecting mechanism interconnecting said display module and said operation module, and configured to enable movement of said display module relative to said operation module.

11. A display module comprising:

a screen frame including a frame body that has a front frame surface facing toward a front side, and that has a rear frame surface opposite to said front frame surface and facing toward a rear side;

a liquid crystal unit that has a front display surface and a rear display surface, that is configured to display an image on one of said front display surface and said rear display surface, and that is mounted to said screen frame, said front display surface being exposed from said screen frame and facing toward the front side, said rear display surface being exposed from said screen frame and facing toward the rear side; and a backlight unit having a light exit surface, and configured to emit light from said light exit surface, said backlight unit having a movable portion that is movably disposed on said screen frame and that is movable between a front frame surface location at which said light exit surface faces toward said front display surface of said liquid crystal unit, and a rear frame surface location at which said light exit surface faces toward said rear display surface;

wherein said screen frame further includes a front guiding structure disposed on said front frame surface of said frame body, and a rear guiding structure disposed on said rear frame surface of said frame body; said backlight unit includes a light guiding structure that is formed with said light exit surface thereon and that is flexible, and a light emitting structure; said light guiding structure serves as said movable portion of said backlight unit, and is slidable between said front frame surface location and said rear frame surface location along said front guiding structure and said rear guiding structure; and said light emitting structure includes a front light emitting component disposed on said screen frame at a side corresponding to said front frame surface to emit light toward said light guiding structure when said light guiding structure is at the front frame surface location, and a rear light emitting component disposed on said screen frame at a side corresponding to said rear frame surface to emit light toward said light guiding structure when said light guiding structure is at the rear frame surface location.

12. The display module as claimed in claim 11, wherein said light guiding structure has a width greater than a width of one of said front display surface and said rear display surface;

when said light guiding structure is at the front frame surface location, said light guiding structure has a portion that extends around a side of said liquid crystal unit to a location adjacent to said rear display surface; and when said light guiding structure is at the rear frame surface location, said light guiding structure has another portion that extends around the side of said liquid crystal unit to a location adjacent to said front display surface.

13. The display module as claimed in claim 11, wherein said frame body further has a top frame portion, a bottom frame portion spaced apart from said top frame portion, and two spaced-apart side frame portions respectively interconnecting said top frame portion and said bottom frame portion, at least one of said side frame portions being separable from said top frame portion and said bottom frame portion.

14. The display module as claimed in claim 11, wherein said backlight unit further includes a front pull structure disposed on said light guiding structure at a side opposite to said light exit surface and corresponding to said front frame surface.

15. The display module as claimed in claim 14, wherein said backlight unit further includes a rear pull structure disposed on said light guiding structure at a side opposite to said light exit surface and corresponding to said rear frame surface.

16. The display module as claimed in claim 11, wherein said front guiding structure includes a first upper horizontal track disposed at a top part of said front frame surface of said frame body, and a first lower horizontal track disposed at a bottom part of said front frame surface of said frame body, said first upper horizontal track and said first lower horizontal track being respectively disposed at two sides of said light guiding structure when said light guiding structure is at the front frame surface location, said light guiding structure being slidable along said first upper horizontal track and said first lower horizontal track; and said rear guiding structure includes a second upper horizontal track disposed at a top part of said rear frame surface of said frame body, and a second lower horizontal track disposed at a bottom part of said rear frame surface of said frame body, said second upper horizontal track and said second lower horizontal track being respectively disposed at two sides of said light guiding structure when said light guiding structure is at the rear frame surface location, said light guiding structure being slidable along said second upper horizontal track and said second lower horizontal track.

17. The display module as claimed in claim 16, wherein said backlight unit further includes a front pull structure disposed on said light guiding structure at a side that is opposite to said light exit surface and that corresponds to said front frame surface, said front pull structure extending vertically and having two ends respectively and slidably engaging said first upper horizontal track and said first lower horizontal track.

18. The display module as claimed in claim 17, wherein said backlight unit further includes a rear pull structure disposed on said light guiding structure at a side that is opposite to said light exit surface and that corresponds to said rear frame surface, said rear pull structure extending vertically and having two ends respectively and slidably engaging said second upper horizontal track and said second lower horizontal track.

19. The display module as claimed in claim 11, further comprising a magnetic unit including:

a backlight magnetic structure disposed on said movable portion of said backlight unit;

a front display surface magnetic structure disposed on said screen frame at the front side of said screen frame, and configured to engage said backlight magnetic structure by magnetic attraction when said light guiding structure of said backlight unit is at the front frame surface location; and a rear display surface magnetic structure disposed on said screen frame at the rear side of said screen frame, and configured to engage said backlight magnetic structure by magnetic attraction when said light guiding structure of said backlight unit is at the rear frame surface location.

* * * * *